United States Patent
Lin

(10) Patent No.: US 7,894,208 B1
(45) Date of Patent: Feb. 22, 2011

(54) SERVER MODULE

(75) Inventor: Te-Chang Lin, San Jose, CA (US)

(73) Assignee: Super Micro Computer Inc. CA (US)

( * ) Notice: Subject to any disclaimer, the term of this patent is extended or adjusted under 35 U.S.C. 154(b) by 73 days.

(21) Appl. No.: 12/510,817

(22) Filed: Jul. 28, 2009

(51) Int. Cl.
*H05K 7/14* (2006.01)
*H05K 5/00* (2006.01)

(52) U.S. Cl. .................. 361/796; 361/730; 361/679.31; 211/41.17

(58) Field of Classification Search ............ 361/679.31, 361/679.33, 729, 730, 796; 211/41.17
See application file for complete search history.

(56) References Cited

U.S. PATENT DOCUMENTS

| 5,715,146 | A | * | 2/1998 | Hoppal | 361/796 |
| 5,774,337 | A | * | 6/1998 | Lee et al. | 361/725 |
| 6,205,020 | B1 | * | 3/2001 | Felcman et al. | 361/679.31 |
| 6,906,914 | B2 | * | 6/2005 | Stamos et al. | 361/679.31 |
| 7,272,013 | B1 | * | 9/2007 | Sivertsen | 361/752 |
| 7,411,784 | B2 | * | 8/2008 | Coglitore et al. | 361/679.41 |
| 7,460,375 | B2 | * | 12/2008 | Randall et al. | 361/724 |
| 2005/0265010 | A1 | * | 12/2005 | Bundza et al. | 361/796 |
| 2006/0044775 | A1 | * | 3/2006 | Hoshino et al. | 361/796 |
| 2006/0227525 | A1 | * | 10/2006 | Hoshino et al. | 361/796 |
| 2008/0037209 | A1 | * | 2/2008 | Niazi et al. | 361/683 |
| 2008/0101011 | A1 | * | 5/2008 | Carr et al. | 361/686 |
| 2008/0144272 | A1 | * | 6/2008 | Liang | 361/685 |
| 2008/0253076 | A1 | * | 10/2008 | Chen | 361/684 |

* cited by examiner

*Primary Examiner*—Lisa Lea-Edmonds
(74) *Attorney, Agent, or Firm*—Chun-Ming Shih; HDLS IPR Service

(57) ABSTRACT

A server module includes a tray, a motherboard installed in the tray, and at least one storage device. The tray includes a port erected from a rear end of the tray, a roomage inwardly and concavely disposed on an edge of the motherboard and proximate to the port, and a socket disposed at an edge of the roomage and opposite to the port for connecting the insert roomage of the storage device, such that the storage device is disposed onto the roomage of the motherboard, and the motherboard can be used for expanding the storage device directly.

10 Claims, 4 Drawing Sheets

SERVER MODULE

BACKGROUND OF THE INVENTION

1. Field of the Invention

The present invention relates to computer hardware, and more particular to a server module used at a service end.

2. Description of Prior Art

As the computer industry advances and companies rely on industrial computers system more and more, the companies have higher requirements on server systems. To cope with the growth of companies, many companies integrate a number of servers to deal with the huge data quantity or network flow, while considering the expansion and upgrade required by the server systems at a later stage. In addition, servers usually work continuously, so halting the servers is unallowable. If the servers malfunction, users of the server systems always require to make maintenance, repair or replacement without halting.

As to the data storage of the system, plural hard disk drives are combined to form a redundant array of independent disks (RAID) for achieving a larger capacity than a single hard disk drive. If data in any one of the hard disk drives are damaged, the RAID can maintain a normal operation of the system, and such RAID technology has been used extensively in servers already. However, the linked hard disk drives still require a periodical replacement for data rearrangement or maintenance, and the operating system and other application programs of a server are generally installed in the hard disk drives. Thus, the replacement or maintenance will affect the normal operation of the server system. Even if an arrangement for replacing a hard disk drive group can be made very rapidly, yet the programs such as the operating system will be replaced when the hard disk drive group is removed. As a result, the server system has to reboot, while it will take much time.

In addition, storage devices such as hard disk drives cannot be installed on the motherboard of a conventional server for an expansion.

SUMMARY OF THE INVENTION

It is a primary objective of the present invention to provide a server module that uses a motherboard of a server to provide a space for installing a storage device such as a 2.5-inch hard disk drive, such that the motherboard can expand the storage device directly and allow the storage device to be installed on the motherboard.

A secondary objective of the present invention is to provide a server module having a storage device directly mounted on its motherboard, which is only for installing application programs and an operating system, and a hard disk drive group only for storing data, so that the operating system with the application programs and general data can be stored separately in different storage units to facilitate the maintenance and repair without affecting one another.

To achieve the primary objective, the present invention provides a server module comprising a tray, a motherboard installed in the tray, and at least one storage device, wherein the tray has a port erected from a rear end of the tray; the motherboard has a roomage inwardly and concavely disposed on an edge of the motherboard and proximate to the port, and a socket disposed at an edge of the roomage and opposite to the port for connecting an insert roomage of the storage device, such that the storage device is disposed onto the roomage of the motherboard to form the server module.

To achieve the secondary objective, the present invention provides a server module, wherein the storage device is provided for installing an operating system and application programs only.

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
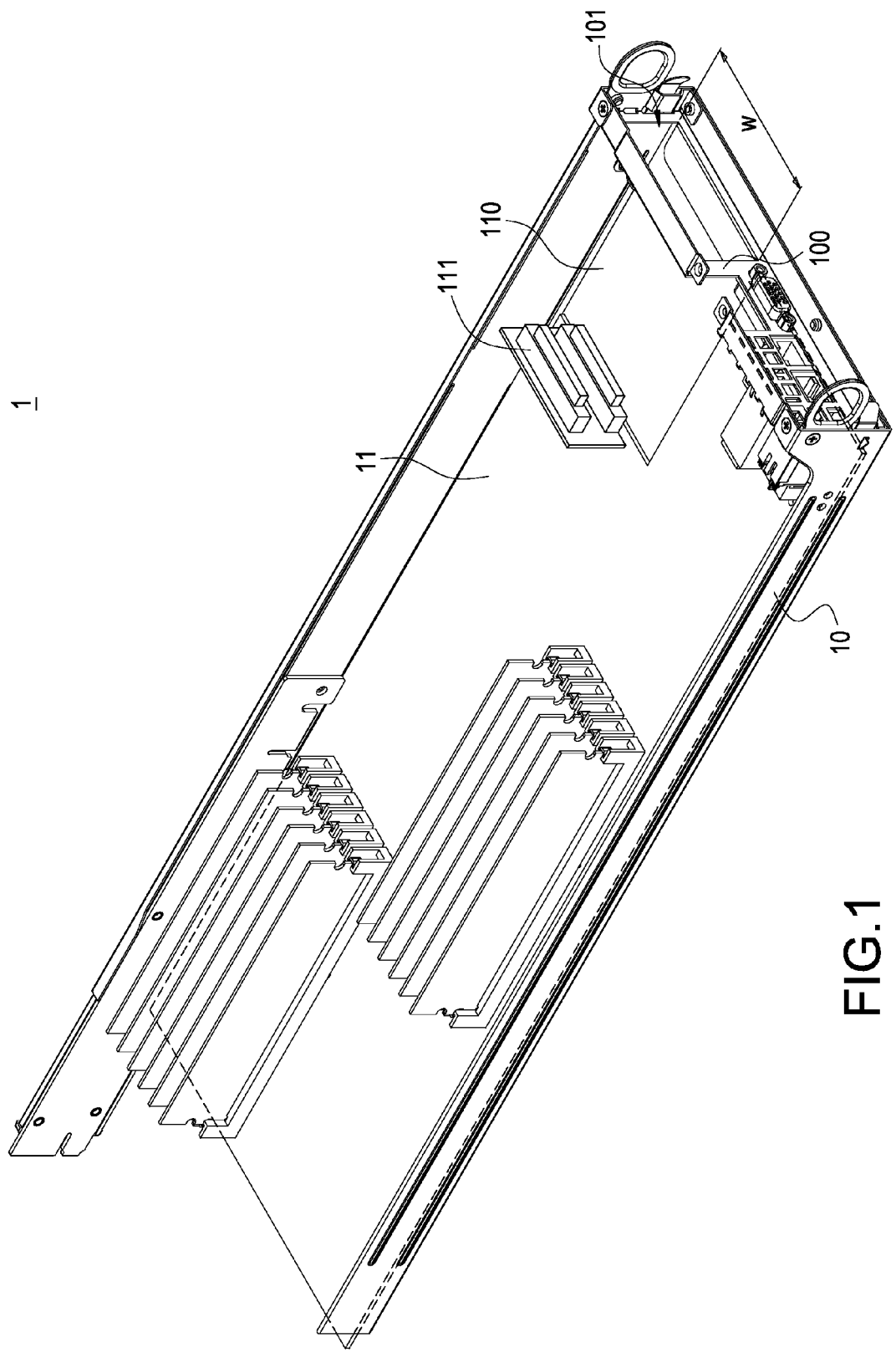
FIG. 1 is a perspective view of a server module without installing a storage device in accordance with the present invention.
Figure 2:
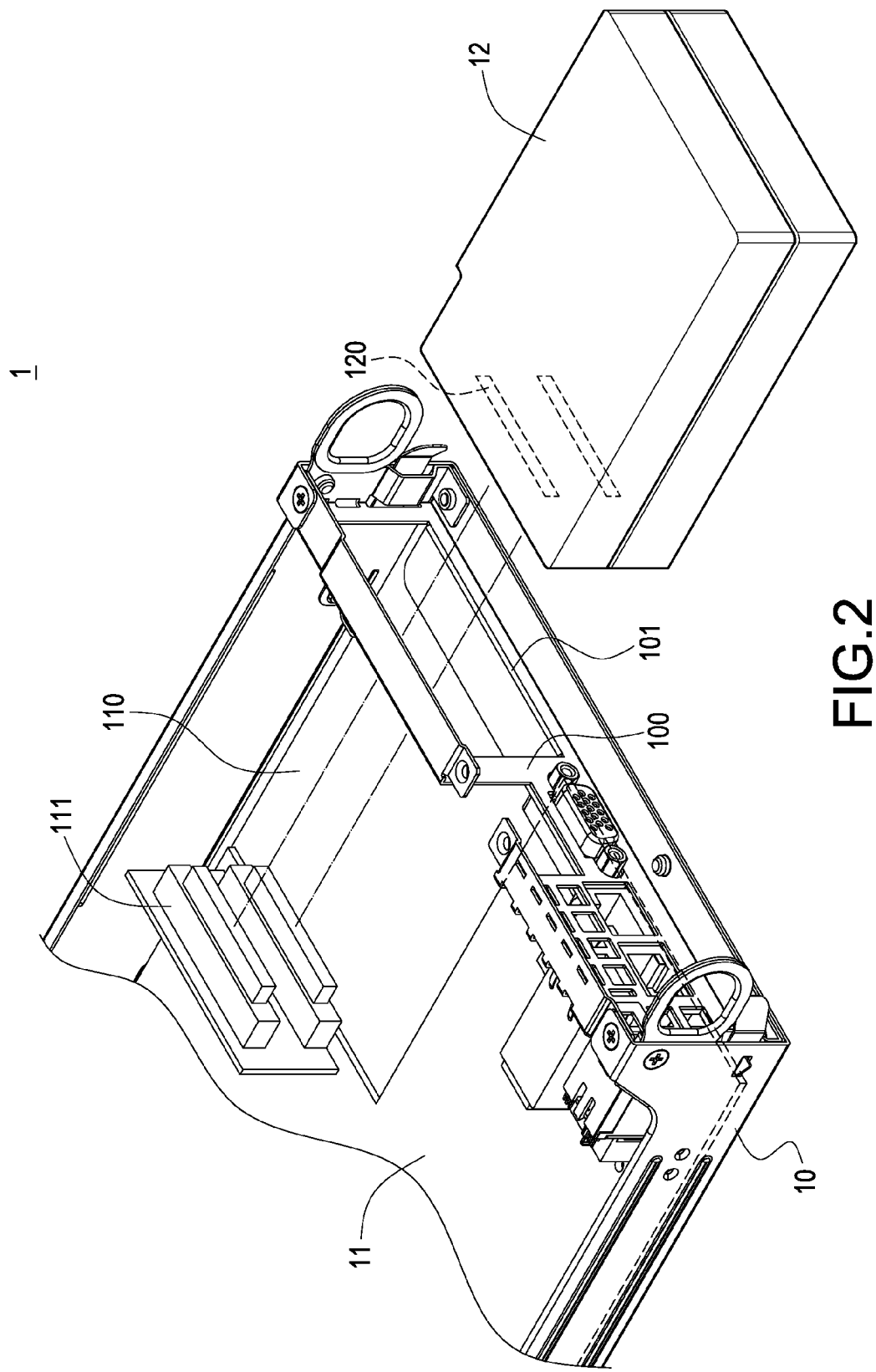
FIG. 2 is a partial exploded view of a server module and its storage device in accordance with the present invention.
Figure 3:
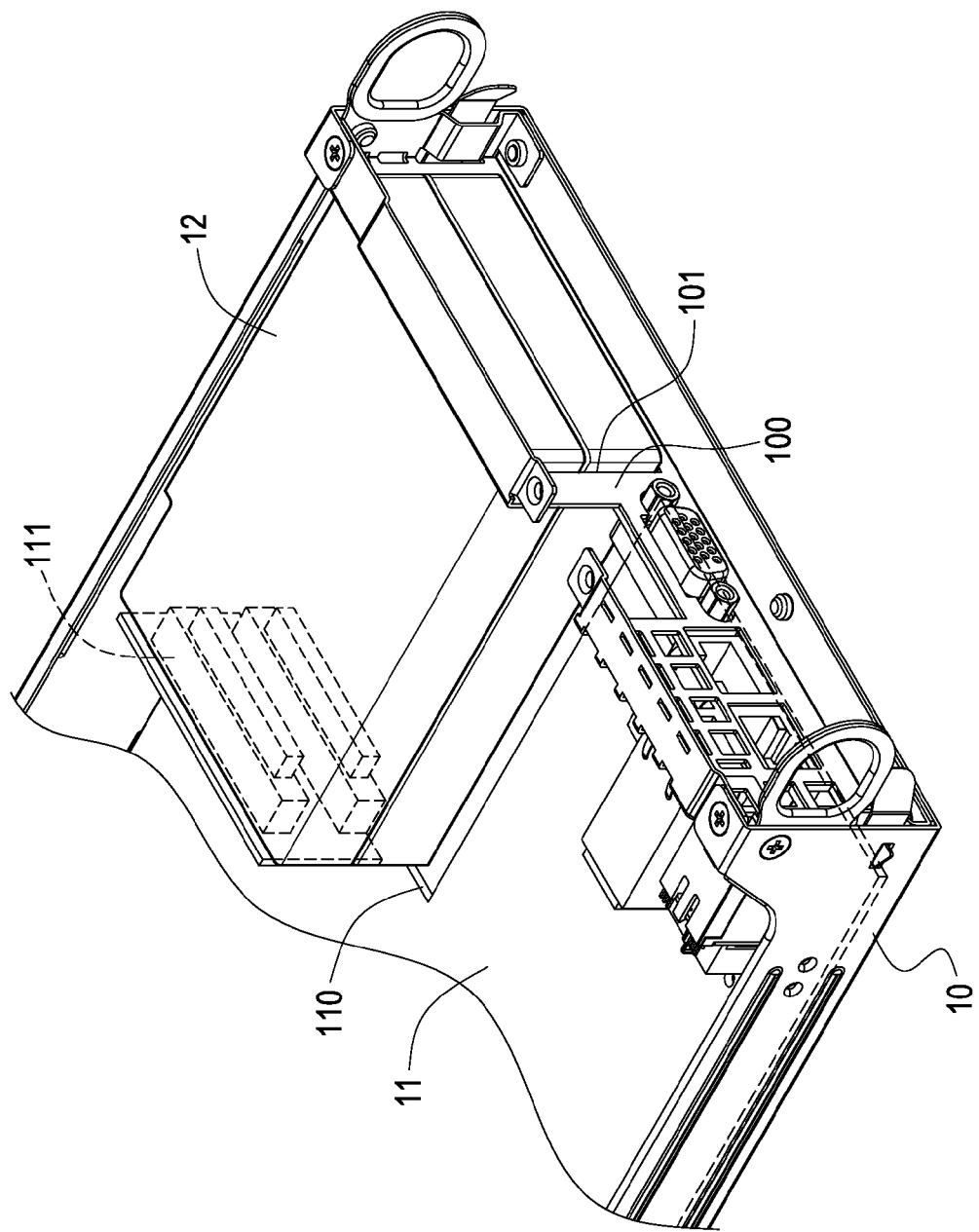
FIG. 3 is a partial perspective view of a server module and its storage device in accordance with the present invention.
Figure 4:
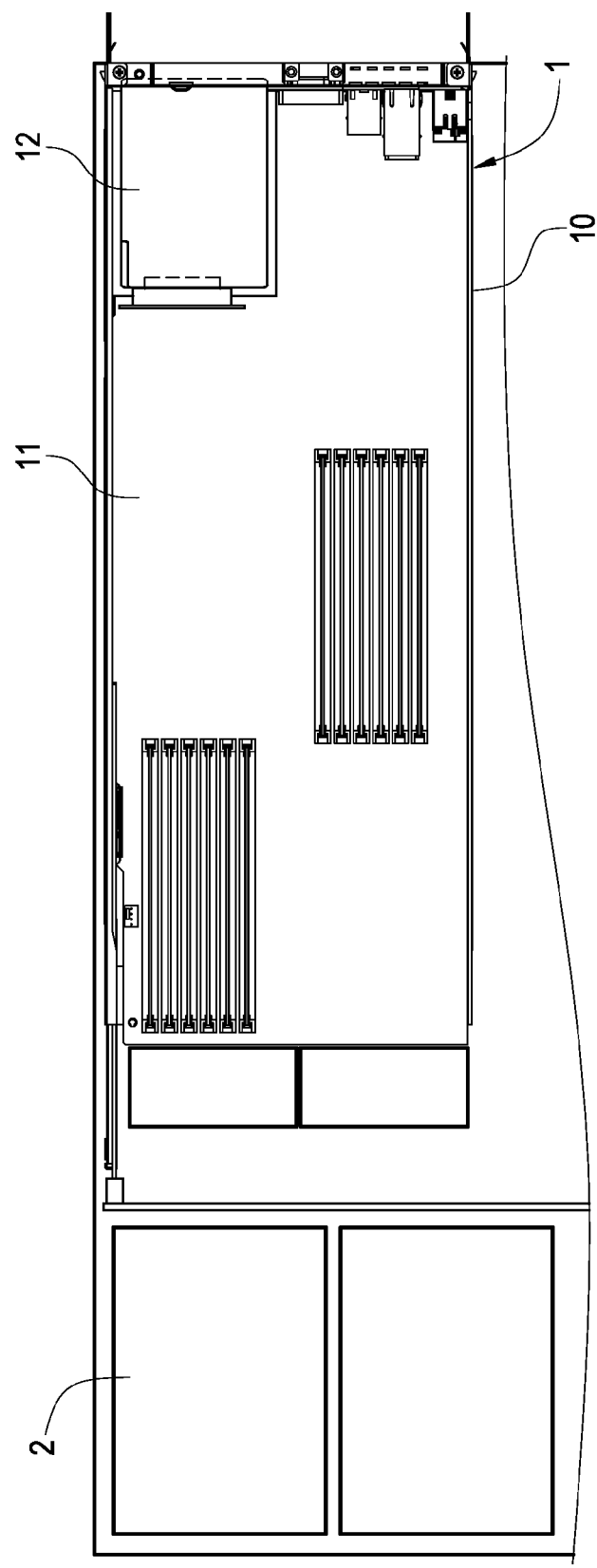
FIG. 4 is a schematic planar view of a server module integrated into a server system in accordance with the present invention.

With reference to FIGS. 1 to 3 for a perspective view of a server module without installing a storage device, a partial exploded view of a server module and its storage device, and a partial perspective view of a server module and its storage device in accordance with the present invention respectively, the present invention provides a server module 1 integrated with a server system (as shown in FIG. 4). The server module 1 comprises a tray 10, a motherboard 11 installed in the tray 10, and at least one storage device 12.

The tray 10 is provided for being horizontally installed by the motherboard 11 and integrates the motherboard 11 with the server system. The tray 10 includes a port 100 erecting from a rear end of the tray 10. The port 100 is provided for exposing and positioning insert holes of various connectors on the motherboard 11.

The motherboard 11 is installed in the tray 10 and includes a roomage 110 inwardly and concavely disposed on an edge of the tray 10 and adjacent to the port 100, and the roomage 110 is disposed adjacent to a side of the motherboard 11 and has a width W approximately equal to 3.2 inches for installing a storage device 12 such as a 2.5-inch hard disk drive, so that the storage device 12 can be retained by the tray 10. The motherboard 11 has at least one socket 111 disposed at an edge of the roomage 110 and opposite to the port 100, wherein the socket 111 can be of a serial AT attachment (SATA) specification corresponding to an insert slot 120 of the storage device 12 such as a 2.5-inch hard disk drive, and provided for connecting the storage device 12.

The storage device 12 can be a 2.5-inch hard disk drive provided for storing application programs and an operating system of the server, and general data are stored in a hard disk drive group 2 (as shown in FIG. 4) of the server system. In other words, the application programs with the operating system and the general data are stored in different storage units separately.

In addition, the port 100 of the tray 10 has an insert opening 101 disposed opposite to the roomage 110 of the motherboard 11 and provided for passing the storage device 12 through the insert opening 101 to insert the insert slot 120 onto the socket 111 of the motherboard 11, such that the storage device 12 can be retained by the tray 10. In a preferred embodiment of the present invention, the motherboard 11 provides two sockets 111 stacked with one another for connecting two storage devices 12, and the insert opening 101 is provided for passing the two stacked storage devices 12.

With the foregoing structure, the server module of the present invention is formed.

With reference to FIG. 4 for a schematic planar view of a server module 1 integrated into a server system in accordance with the present invention, the roomage 110 of the motherboard 11 can be used for expanding the storage device 12. Since the application program such as the operating system of the server is stored and installed in the storage device 12 of the server module 1, and the general data are stored in other hard disk drive group 2 of the server system, therefore the removal or maintenance operations of the hard disk drive group 2 of the server system will not affect the normal operation of the application program such as the operating system in the storage device 12. In the meantime, if it is necessary to format a removed hard disk drive group 2, the programs including the installed operating system will not be deleted. Therefore, the present invention can save the time and simplify the operation for maintaining or repairing the hard disk group 2.

In summation of the description above, the present invention provides an innovative product capable of achieving the expected functions, overcoming the shortcomings of the prior art, and complying with the patent application requirements, and thus the present invention is duly filed for patent application.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A server module, comprising:
  a tray, having a port erected at a rear end of the tray;
  a motherboard, installed in the tray, and having a roomage inwardly and concavely disposed on an edge of the motherboard and adjacent to the port, and a socket disposed at an edge of the roomage and opposite to the port; and
  a storage device, installed in the roomage, and having an insert slot for connecting the socket of the motherboard.

2. The server module of claim 1, wherein the port of the tray has an insert opening disposed opposite to the roomage of the motherboard for passing the storage device through the insert opening and inserting insert slot onto the socket of the motherboard.

3. The server module of claim 1, wherein the roomage of the motherboard has a width of 3.2 inches.

4. The server module of claim 1, wherein the socket of the motherboard is of a serial AT attachment (SATA) specification.

5. The server module of claim 1, wherein the storage device is a 2.5-inch hard disk drive.

6. The server module of claim 1, wherein the roomage of the motherboard is disposed adjacent to a side of the motherboard.

7. The server module of claim 1, wherein the motherboard further comprises an another socket, and the two sockets are stacked with each other.

8. The server module of claim 7, further comprising an another storage device coupled to the another socket.

9. The server module of claim 7, wherein the port of the tray has an inset opening disposed opposite to the roomage of the motherboard, and provided for passing the two storage devices through the insert opening, such that the insert slot is inserted separately onto the two sockets.

10. The server module of claim 1, wherein the storage device is provided for installing an application program only.

* * * * *